Nov. 12, 1940.    N. N. OKUN    2,221,554
SEALED BEARING
Filed Aug. 22, 1938
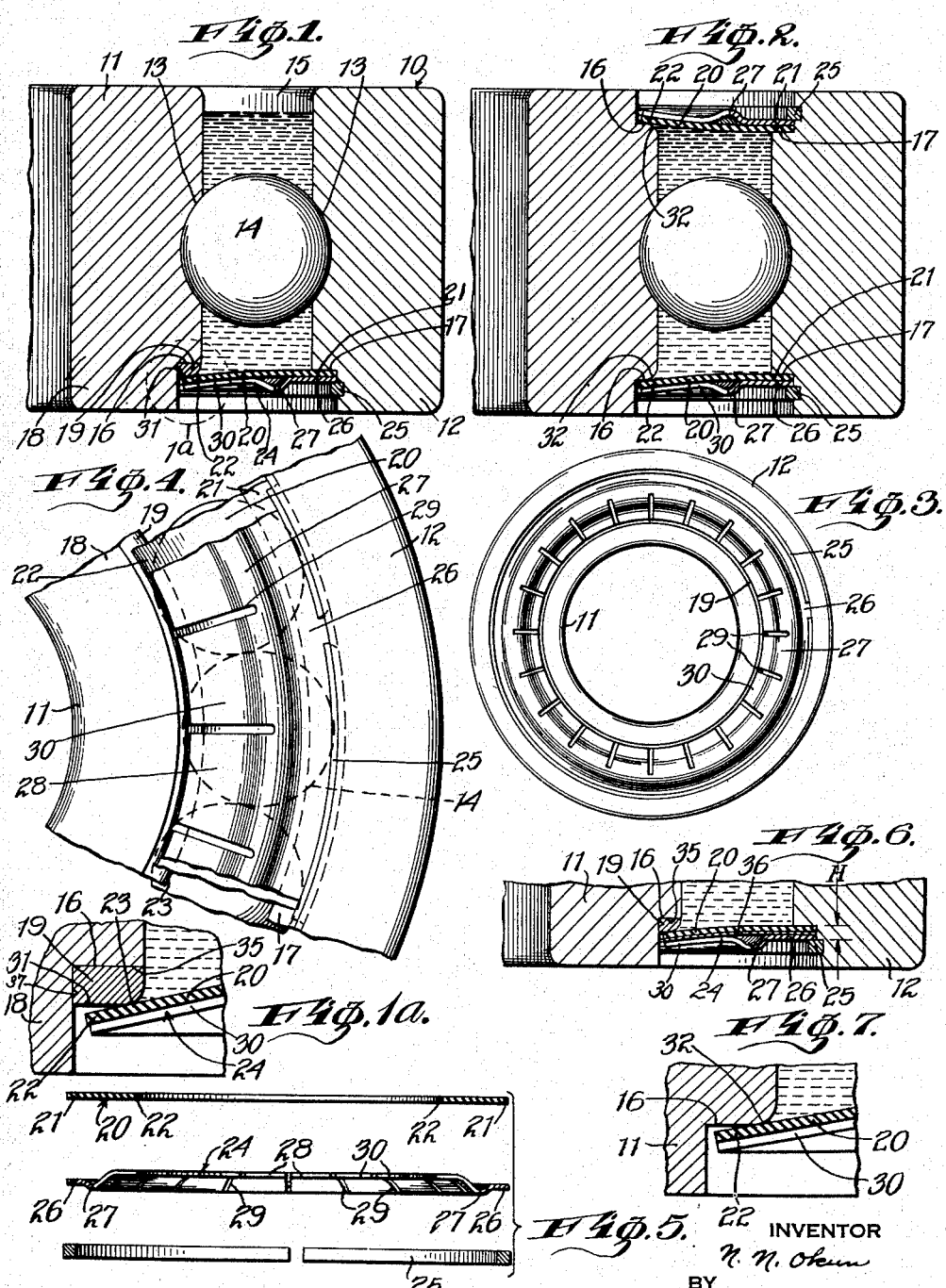
INVENTOR
N. N. Okun
BY
ATTORNEY Patented Nov. 12, 1940

2,221,554

UNITED STATES PATENT OFFICE 2,221,554

SEALED BEARING

Nathaniel N. Okun, Bronx, N. Y., assignor of one-third to Charles M. Palmer, Washington, D. C.

Application August 22, 1938, Serial No. 226,170

9 Claims. (Cl. 308—187.1)

The present invention deals with anti-friction bearings and has as one object to provide an improved and efficient means for effectively sealing spaced annular races of an anti-friction bearing to preclude the egress of lubricant from the lubricant sealing channel defined by these races and to preclude the admission of dirt, grit or other undesirable particles into the bearing. The invention has as a further object the provision of a novel bearing adapted for utilization in connection with high and low speed equipment and characterized by a relatively thin flexible and resilient annular closure bridging an annular lubricant receiving channel defined by a pair of spaced races of the bearing and more particularly abutting spaced and offset shoulders of the inner and outer races of the bearing, the arrangement being such, that a part of the closure means is firmly held against the shoulder of the outer race by the aid of the action of a snap ring and yieldingly held against the shoulder of the inner race by an annular and offset resilient and radially split thrust ring secured firmly in the outer race and having radially arranged fingers resiliently abutting the portion of the closure means in yieldable relation in respect to the shoulder of the inner race. The invention has as a further object the provision of a relatively rugged and durable seal in an anti-friction bearing provided with spaced races held sealed by a resilient and flexible closure and a split annular thrust member held in part flexed and biased in respect to a shoulder of a floating annular self lubricating collar to hold the latter yieldingly against an annular rotatable shoulder of an inner race of the bearing. Other objects, advantages, and features of the invention will be more readily appreciated from a consideration of the following detailed description taken in connection with the accompanying drawing depicting several illustrative embodiments of the invention wherein:

Fig. 1 is a sectional view of an anti-friction high speed bearing according to my invention.

Fig. 1ª is a magnified fragmentary view of Fig. 1 and particularly that portion of Fig. 1 enclosed by the circle 1ª in dash lines.

Fig. 2 is a sectional view of another form of the invention.

Fig. 3 is a side view of Fig. 1.

Fig. 4 is an enlarged but fragmentary view of Fig. 3.

Fig. 5 is an exploded view of the seal comprising the closure means, the thrust means, and the retaining means.

Fig. 6 is a fragmentary sectional view of another bearing showing a slightly modified seal and including a take up washer, and Fig. 7 is a fragmentary and enlarged view of Fig. 2.

The bearing generally denoted 10 includes an inner rotatable annular race 11 and outer annular race 12 usually retained in a fixed relation. Each of the races includes a groove 13 rotatably guiding and retaining metal spheroids or ball 14 in part disposed in an annular lubricant receiving well or chamber 15. The bearing shown in Fig. 1 is merely illustrative of the type that can be employed in connection with the seal according to the invention and as is well appreciated the seal may be utilized in connection with the other types of anti-friction bearings although it is to be understood that the invention is not limited in this respect.

In the form according to Fig. 1, the inner race 11 includes an annular shoulder 16. The outer race 12 is also provided with an annular shoulder 17. These shoulders are out of horizontal alinement as shown. Mounted on the reduced part or neck 18 of the inner race is a brass annular collar 19 which is held yieldingly against shoulder 16 by a resilient and flexible annular closure 20. This closure may be of relatively hard but of a flexible fibrous material and/or bakelite. The material employed is generally know in the art as "Micarta." Instead of "Micarta" closure 20 may be of a suitable synthetic rubber impregnated with oil to create a drag on collar 19. The outer margin 21 thereof is held firmly against shoulder 17 while its inner margin 22 is held yieldingly against a rounded corner 23 of the self alining float spacer ring 19.

Collar or ring 19 is preferably of a suitable brass material which has been impregnated with oil during the process of manufacture and the particular material is known in the trade as "Oilite" and when in frictional engagement with a surface it is self lubricating. Instead of "Oilite" collar 19 may be of a suitable micro fine lubricating graphite.

To effectively hold closure 20 in sealing relation against collar 19 and against shoulder 17, an annular metal thrust washer 24 and a snap ring 25 are employed. This thrust washer 24 is a relatively thin, resilient, and, flexible one piece metal member and comprises an outer margin or annular flange 26, a struck out and outwardly extending annular bead 27, and an offset and radially extended annular split inner flange 28, which is provided with a plurality of radially extending slots 29 defining the radially disposed and spaced resilient fingers 30 normally out of alinement or offset in respect to the outer flange 26, that is, the inner flange 28 containing the resilient fingers is normally out of alinement with the outer flange 26.

In securing the seal in the form according to Fig. 1, the brass collar 19 is first mounted on shoulder 16. Thus the outer annular face 31 of the collar is out of alinement with the shoulder 17 of the outer race 12. Thereafter the annular flexible and resilient closure 20 is placed on collar 20 and on shoulder 17. Subsequently the split and offset thrust washer 24 is placed on the flexible closure 20 in such a way that the intermediate annular bead 27 thereof faces outwardly. Since the fingers 30 are offset in respect to the outer flange 26 of the thrust washer 24, these fingers only now contact closure 20. Thereafter the snap or retaining ring 25 is fixedly secured or anchored in any well known fashion within the outer race 12 and against the outer flange 26 of the thrust washer. This action slightly distorts the intermediate bead 27 and causes the spaced fingers 30 of the thrust washer 24 to urge the inner rim or margin 22 of the flexible and resilient closure 20 radially and yieldingly against the rounded annular corner 23 of collar 19. Since the outer face 31 of the collar is out of alinement with shoulder 17, it will be observed that the split thrust washer 24, that is, the radially arranged fingers 30 thereof hold the inner rim 22 of the closure in a biased relation in respect to the outer face 31 but yieldingly against the rounded corner 23. It follows therefore that as the inner steel race 11 rotates in respect to the steel outer race 12, an effective seal is provided between the rounded corner 23 of floating collar 19 and the flexible closure 20, and since the thrust exerted by fingers 30 is always in a direction towards collar 19, yieldable contact between the collar 19 and closure 20 is maintained continuously and consequently drainage of lubricant from the annular lubricant receiving chamber is prevented at the same time grit or other undesirable particles are prevented from entering the seal between the collar 19 and closure 20.

As shown in Fig. 1, the annular self aligning collar 19 has its inner annular surface 35 in contact with shoulder 16 and in practice shoulder 16 rotates relative to surface 35 although collar 19 slightly floats or slips on neck 18 due to a slight clearance usually existing between bore 37 of collar 19 and the reduced neck 18. However the biased spring fingers 30 exert pressure on the rounded annular corner 23 to yieldingly hold the surface or face 35 against shoulder 16 and the surface or bore 37 yieldingly against neck 18.

In the form according to Fig. 2 the self lubricating and self aligning float collar 19 has been eliminated and a seal according to the invention is applied at each end of the bearing. However in the case of the form shown in Fig. 2, shoulders 16 extend outwardly beyond shoulder 17 and each of the shoulders 16 is provided with a rounded corner 32 yieldingly engaged under pressure by the inner rim 22 of its respective closure 20 in a manner disclosed in connection with the form shown in Fig. 1. In other aspects the form shown in Figs. 2 and 7 is along the lines of the embodiment according to Fig. 1, and it should be noted that if the inner race 11 is rotating, rim 22 of closure 20 yieldingly bears against an adjacent curved corner 32 which rotates or rides thereagainst.

In case of the seal shown in Fig. 7, the frictional and yieldable engagement between closure 20 and annular corner 32 has been found appropriate for low speeds. However in the case of high speeds, it has been found advisable to appreciably reduce such friction and this has been accomplished in the utilization of a self lubricating collar such as 19 having a material different than the material of the races as heretofore pointed out.

In the case of the form shown in Fig. 6, a relatively thin annular fibroid take up diaphragm or washer 36 is interposed between the metal thrust washer 24 and the closure 20 to compensate for any irregularities in thickness of these members in the event their combined thickness is not equivalent to the distance H which in practice should be equivalent to the normal combined thickness of these members.

It should be understood and as is well appreciated that although the seal according to the invention has been described as having outer end fixedly carried by the outer race and an inner end yieldingly abutting an inner rotatable race, it is within the province of the invention to secure one end of the seal fixedly to the inner race in such a way that the outer end of the seal yieldingly abuts the outer race.

Without further analysis, the foregoing disclosure will so fully reveal the gist of the present invention that others can by applying current knowledge readily adapt it to various applications without omitting certain features that from the standpoint of the prior art fairly constitute the essential characteristics of the generic and specific aspects of the invention and therefore such adaptations are intended to be comprehended within the meaning and range of equivalency of the following claims.

I claim:

1. In a seal for a pair of spaced races defining a channel, said seal comprising a flexible and resilient annular closure bridging said channel, an annular thrust exerting member having an inner radially split annular portion, an outer annular portion offset in respect to said inner split portion and an annular bead merging with said portions, and means for securing said outer portion to one of said races to firmly abut said closure and to stress said bead for urging said split inner portion yieldingly against said closure to permit the latter to yieldingly abut another of said races.

2. In a seal for a pair of spaced races defining a channel, said seal comprising spaced and offset means associated with said races, a flexible and resilient annular closure bridging said channel and contacting said offset means, a resilient thrust exerting annular member having an inner split annular portion, an outer annular portion offset in respect to said inner split portion and an annular bead merging with said portions, and means for securing said outer portion to one of said races to firmly abut said closure to permit the latter to abut one of said offset means and to stress said bead for urging said split portion yieldingly against said closure to permit the latter to yieldingly abut another of said offset means.

3. In a seal for an inner race with a curved portion and an outer race with a shoulder and the races defining a channel, said seal comprising a flexible and resilient annular closure bridging said channel and contacting the shoulder of said outer race and said curved portion, an annular resilient thrust exerting member having an inner split annular portion, an outer annular portion, offset in respect to said inner split portion and an annular bead merging with said portions, and means for securing said outer portion to said outer race to permit a portion of said closure to abut the shoulder of said outer race and to stress said bead for urging said split portion yieldingly against another part of said closure and the latter yieldingly against said curved portion.

4. In a seal for a pair of spaced races with shoulders and defining a channel, said seal comprising an annular closure contacting said shoulders, an annular thrust exerting member having an outer annular portion, an intermediately arranged annular bead and an inner annular radially split portion offset in respect to said outer portion, and means securing said outer portion to one of said races to firmly hold said closure to said last mentioned race and to stress said bead for yieldingly urging said split portion against said closure to hold the latter yieldingly against the shoulder of the other race of said pair.

5. In a seal for an inner race with a shoulder and an outer race with a shoulder and defining a channel with said inner race, said seal comprising a ring mounted on the shoulder of said inner race and having a face offset in respect to the shoulder of said outer race, a flexible and resilient annular closure bridging said channel and contacting said face and said shoulder of said outer race, an annular thrust exerting member having an inner split annular portion, an outer annular portion offset in respect to said inner split portion and an annular bead merging with said portions, and means securing said outer portion to said outer race to firmly hold said closure against said shoulder of said outer race and to stress said bead for urging said split portion yieldingly against said closure to hold the latter yieldingly against said face.

6. In a seal for an inner race with a shoulder and an outer race with a shoulder and defining a channel with said inner race, said seal comprising a self lubricating ring mounted on said inner race and movably contacting the shoulder of the latter and having an outer curved portion out of alinement in respect to the shoulder of said outer race, a flexible and resilient annular closure bridging said channel and contacting the shoulder of said outer race and said curved portion, an annular resilient and flexible thrust exerting member having an inner radially split annular portion constituting a plurality of spaced and radially arranged fingers, an outer annular portion offset in respect to said inner split portion and an annular hollow outwardly extending bead merging with said portions, and anchoring means securing said outer portion to said outer race to firmly hold said closure against the shoulder of said outer race and to stress said bead for urging said fingers yieldingly against said closure to hold a portion thereof in a biased relation and yieldingly against said curved portion.

7. In a seal for a pair of spaced races with shoulders and defining a channel, said seal comprising an annular closure contacting said shoulders, an annular thrust exerting member having an annular rim, an intermediately arranged annular bead and an annular radially split portion, and means securing said rim to the shoulder of one of said races to firmly hold said closure to said last mentioned race and to stress said bead for yieldingly urging said split portion against said closure to hold the latter yieldingly against the shoulder of the other race of said pair.

8. In a seal for a pair of spaced races with shoulders and defining a channel, said seal comprising an annular closure contacting said shoulders, a floating ring carried by one of said races adjacent its shoulder, an annular thrust exerting member having an annular rim, an intermediately arranged annular bead and an annular split portion, and means securing said rim to another race of said pair to firmly hold said closure against the shoulder of said last mentioned race and to stress said bead for yieldingly urging said split portion against said closure to hold said ring yieldingly against the shoulder of said race carrying said ring.

9. In a seal for an inner race with a shoulder and an outer race with a shoulder and defining a channel with said inner race, said seal comprising a self lubricating floating ring mounted on said inner race and movably contacting the shoulder of the latter and having an outer curved portion out of alinement in respect to the shoulder of said outer race, a flexible and resilient annular closure bridging said channel and contacting the shoulder of said outer race and said curved portion, an annular resilient and flexible thrust exerting member having an inner radially split annular portion constituting a plurality of spaced and radially arranged fingers, an outer annular rim offset in respect to said split portion and an annular hollow outwardly extending bead merging with said rim and portion, and anchoring means securing said rim to said outer race to firmly hold said closure against the shoulder of said outer race and to stress said bead for urging said fingers yieldingly against said closure to hold a portion of the latter in a biased relation and yieldingly against said curved portion.

NATHANIEL N. OKUN.